June 3, 1969 — W. E. KELLY — 3,448,430
GROUND CONNECTOR
Filed Jan. 23, 1967

INVENTOR
WILLIAM E. KELLY
BY ATTORNEY

United States Patent Office 3,448,430
Patented June 3, 1969

3,448,430
GROUND CONNECTOR
William E. Kelly, Bradley Beach, N.J., assignor to Thomas & Betts Corporation, Elizabeth, N.J., a corporation of New Jersey
Filed Jan. 23, 1967, Ser. No. 611,176
Int. Cl. H01r 13/46, 17/18; H02g 15/02
U.S. Cl. 339—143                                    4 Claims

ABSTRACT OF THE DISCLOSURE

In a connector for securing jacketed, metal clad (armored) cable to a termination point or connector body, a grounding ring having a tooth portion formed thereon to be inserted between the outer surface of the armor and the inner diameter of the jacket, locating the tooth and ring in proper position for the grommet's action. A gland nut and retainer ring and the grommet are disposed at one side and connector body on the other side of the grounding ring. The cable is prepared by cutting the armor and jacket at one end; the cable is threaded through the gland nut, retaining ring and grommet and the grounding ring is inserted between the armor and jacket, all the way, and the parts are assembled, with the gland nut engaging the connector body member.

---

Figure 1:
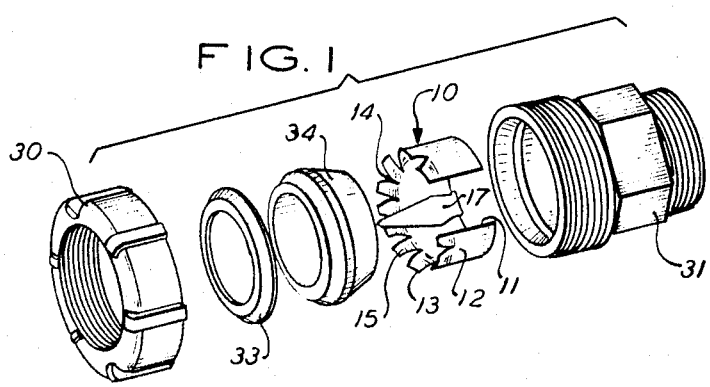

This invention relates to a novel, self adjusting, electrical connector providing watertight, strain relieved, grounded connection for thus grounding a cable having an outer shell or metal jacket, to a terminating body member. Heretofore, water tightness and strain relief were sought in such installations by utilizing a compressible grommet to surround the jacket of the cable and simultaneously plugging the aperature receiving the cable; such grounding under prior methods, was deficient and objectionable in several respects:

In prior method (a) a portion of the end of the cable is stripped of its jacket, leaving the metal armor exposed. A metal ring, of length equal to the exposed armor, replaced the now removed portion of the jacket. After inserting this assembly into a connector, screws were applied from the exterior and through the connector wall, and forced to bear on the metal ring, for a metallic grounding path of continuity.

The procedure of method (b) corresponded with (a) above but did not include the use of any metal ring; the screws therefor bore directly on the armor of the cable.

Procedure (c) corresponded with procedure (b) above except that the inner ends of the screws were provided with pads of various shapes to bear on the armor.

In procedure (d) a portion of the jacket was stripped from the end of the cable's armor (as in procedure (a) above) and a piece of soft metal (as lead) formed into a ring, with conical outer shape, and compressed within the connector to bear on the armor and the inner wall, for the ground contact.

In each of the four typical prior practices above described, the desired objectives were not achieved for several reasons:

(1) in all four methods, water tightness is not accomplished; in (a), (b) and (c) the screws that penetrate the wall of the connector also provide a path for water entrance. In method (d) the compression device for the metal ground ring also provides a path for water entrance. Hence devices heretofore employed were not watertight.

(2) In each of the four methods above mentioned, ground continuity is not certain of accomplishment. Due to the construction of the above mentioned assemblies, the terminator is closed when the means for achieving the desired contact grounding is employed. For example, in procedures (a), (b) or (c), the connector is attached in its intended manner to jacketed armor cable; the tightening of the screws to contact the cable's armor is performed in "blind" fashion. Whether the screw is binding in its hole, coming to bear on the jacket, or going through the armor and bearing on the conductors within the cable, cannot be determined with certainty. Hence the procedures are not positive. Similar hidden conditions exist with respect to method (d).

Thus, good ground contact is not assured and cannot be visually checked or verified.

The connector of the present invention comprises essentially a chamber with no screws penetrating its sides but with a novel ground ring and other features for achieving all desired objectives above mentioned. In addition, prior procedure of stripping back of the jacket is eliminated by my invention; positioning of the ground ring and grommet is performed outside the connector, assuring positive ground contact.

My invention provides a ground ring and grounded connector of unique structure and operation. My improved connector, when applied and installed pursuant to the invention, renders the connection of the connector to jacketed metal clad (armor cable) water tight, strain relieved, grounded, is self-adjusting to a range of cable sizes, and is free from heat rise due to hysteresis.

The drawings, illustrating procedures and devices useful in carrying out the invention, and the description below, are exemplary only of the invention, which shall be deemed to cover all other devices and procedures coming within the scope and purview of the appended claims.

Figure 2:
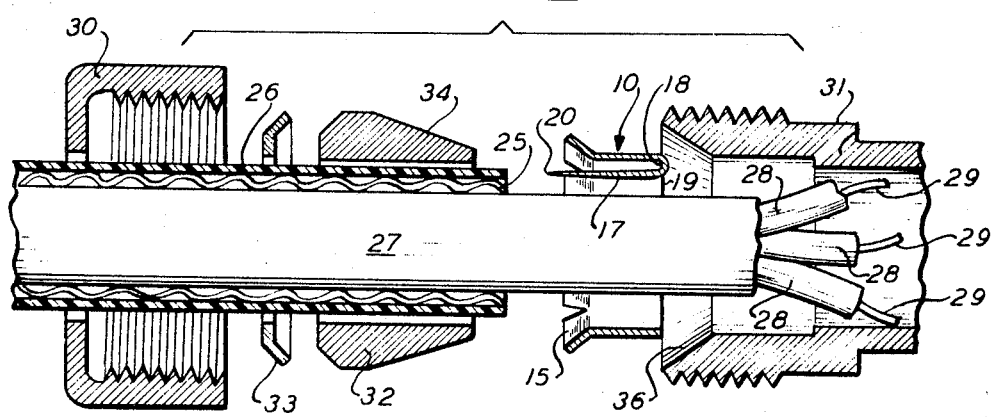

In the drawings, wherein similar reference characters indicate like parts:

FIG. 1 is an exploded, perspective view of a connector embodying the invention, and FIG. 2 is a similar, longitudinal vertical sectional view thereof, in position for assembly on a jacketed armored cable.

The drawings illustrate a connector embodying my invention, comprising a ground ring 10, preferably split at 11 (FIG. 1) and having a rim portion 12 provided, along one end 13 thereof with a plurality of longitudinal slits 14 defining a plurality of fingers 15 flared circumferentially outwardly for a purpose presently explained. The ground ring is provided with a tooth 17 secured thereto or formed thereon, with a 180° bend 18 (FIG. 2) at one end 19, said tooth being pointed, at the opposite end, 20, thereof for insertion intermediate the outer shell or jacket 25 of cable 27 (for example, metal clad or armored cable) and the inner diameter of the dielectric or plastic jacket 26, the bend 18 preventing excess insertion. Cable 27 may comprise one or more cables 28 of any type, such as cables having conductors 29 (FIG. 2).

Pursuant to the invention, the ends of the outer shell or jacket 25 and plastic jacket 26 are cut, and the cable 27 is threaded through gland nut member 30, retaining ring 33, and grommet 32. The ground ring tooth 17 is inserted completely between the outer shell or jacket 25 and the plastic jacket 26, all the way, (excess insertion being prevented by bend portion 18 or other stop means not shown). The cable is held in the grommet 32, and the connector body member 31 is pushed on the ground ring 10, the grommet bevel 34 (ground ring fingers 15) adjust to seat in seat 36 in the connector body 31 having external threads meshing with internal threads in the gland nut 30. The connector body 31 and the gland nut 30 are inter-engaged, completing the assembly.

In order of function and installation sequence, pursuant to the invention, the ground ring 10 is used as follows:

The 180° bend 18 of the tooth 17 limits the degree of insertion and disposes the tooth 17 and ground ring 10 at proper position for the action of the grommet 32. The ring 10 provides a matching seat 15 for the grommet bevel 34, and being attached only at its center base to the tooth 17, said ring 10 is self aligning around the cable and in the connector. The ground ring 10, being split as at 11, prevents the formation of a magnetic field by the metallic ring when single conductor cable is used, and thus eliminates heat rise due to the hysteresis. As above noted, the end 13 of the ring 10 is beveled or provided with the outwardly circumferentially directed fingers 15 complementary to the grommet bevel 34, the ring 10 thus expanding or contracting to conform to seat 36 in the connector body 31.

When the ground ring is inserted, as above described, and the grommet 32 is brought up to it in plain view, outside the connector, and then placed inside the connector, the only remaining function to be performed is to compress the grommet 32. This will not disturb the original setting of the ring 10, grommet 32 or cable 27 but will only cause pressure to bear inwardly to press the tooth 17 of the ring 10 onto the outer shell or jacket 25, inwardly, forming a pressure joint between the jacket 26 and the grommet 32 and hence outwardly, spreading the fingers 15 of the ring rim to conform and bear on the inside seat 36 of connector body 31. The outward pressure will also make a pressure joint above the ring rim area from the grommet 32 to the seat 36 of the connector, forming a watertight seal.

Thus, the connector of this invention will, when applied and installed pursuant to the invention, make a connector to jacketed metal clad (armor cable) connection which is watertight, strain relieved, grounded, with the ground ring self adjusting to a range of cable size, and free from heat rise due to hysteresis.

In cases in which the dielectric jacket 26 is omitted and the conductive outer shell or armor 25 becomes the outer shell as above noted, the tooth 17 of the ground ring 10 is positioned over the conductive shell 25 (as it would be when there is a dielectric jacket) and the tooth 17 is thus disposed intermediate shell 25 and grommet 34. On assembly of the parts, the grommet 34 will compress the tooth 17 down onto the shell 25; the assembly procedure is otherwise as it would be when the cable is provided with the dielectric jacket 26.

While the foregoing disclosure of exemplary embodiments, is made in accordance with the Patent Statutes, it is to be understood that the invention is not limited thereto or thereby.

I claim:
1. In a connector for coupling a semi-rigid, metal clad cable to further fittings, said connector having a connector body, a sealing ring, a retainer and a gland nut, each having longitudinal passages therethrough for receipt therein of said cable, said gland nut being coupled to said connector body to assemble said connector; a grounding ring having a longitudinal passage therethrough to receive said cable therein; a first end of said grounding ring being flared outwardly from the axial center of said grounding ring; said grounding ring having a longitudinal split therein to permit said grounding ring to adjust in diameter to different cable diameters when squeezed between said sealing ring and connector body during assembly; a tooth extending from the second end of said grounding ring and extending towards said first end; said tooth spaced apart from said grounding ring and arranged to engage the outer metallic surface of said metal clad cable to provide a ground connection between said grounding ring and said outer metallic surface when engaged by said sealing ring during connector assembly.

2. A connector, as defined in claim 1, wherein said first end of said grounding ring is segmented to provide a plurality of fingers.

3. A connector, as defined in claim 1, wherein said metal clad cable further includes an outer nonconducting jacket about metal cladding, said tooth having a tapered free end adjacent said first end of said grounding ring to facilitate the insertion of tooth between said outer jacket and said outer metallic surface; said tooth being proportioned to minimize distortion of said outer jacket during insertion of said tooth.

4. A connector, as defined in claim 2, wherein the coupling between said tooth and said grounding ring at the second end thereof limits the insertion of said outer jacket into said grounding ring.

References Cited

UNITED STATES PATENTS

| | | | |
|---|---|---|---|
| 2,781,785 | 2/1957 | Davies | 138—25 |
| 2,986,720 | 5/1961 | Chess | 339—89 |
| 3,010,747 | 11/1961 | Bondon | 287—116 |
| 3,109,052 | 10/1963 | Dumire et al. | 174—88 |
| 3,111,352 | 11/1963 | Theodoseau | 339—30 |
| 3,275,737 | 9/1966 | Caller | 174—89 |

FOREIGN PATENTS

| | | |
|---|---|---|
| 1,102,849 | 3/1961 | Germany. |
| 1,035,830 | 7/1966 | Great Britain. |
| 94,560 | 7/1959 | Norway. |

MARVIN A. CHAMPION, *Primary Examiner.*

JOSEPH H. McGLYNN, *Assistant Examiner.*

U.S. Cl. X.R.

174—75, 78; 339—177